United States Patent [19]

Watanabe

[11] Patent Number: 4,503,940

[45] Date of Patent: Mar. 12, 1985

[54] VARIABLE-VOLTAGE VARIABLE-FREQUENCY ELEVATOR CONTROL APPARATUS

[75] Inventor: Eiki Watanabe, Inazawa, Japan

[73] Assignee: Mitsubishi Denki Kabushiki Kaisha, Japan

[21] Appl. No.: 576,557

[22] Filed: Feb. 3, 1984

[30] Foreign Application Priority Data

Feb. 16, 1983 [JP] Japan .................................. 58-23965

[51] Int. Cl.³ .............................................. B66B 5/02
[52] U.S. Cl. ............................ 187/29 R; 187/29 A; 318/779; 318/809; 318/759
[58] Field of Search ............... 318/375, 376, 379, 380, 318/757, 759, 762, 763, 779, 809; 187/29 R, 29

[56] References Cited

U.S. PATENT DOCUMENTS

| 3,379,949 | 4/1968 | Todd | 318/376 X |
|---|---|---|---|
| 3,596,160 | 7/1971 | Rakes | 318/258 X |
| 3,906,299 | 9/1975 | Mittelstaedt | 318/87 X |
| 3,916,276 | 10/1975 | Ottoson | 318/269 |
| 4,123,692 | 10/1978 | Gilmore et al. | 318/722 X |
| 4,133,413 | 1/1979 | Watanabe | 187/29 R |
| 4,165,801 | 8/1979 | Watanabe et al. | 187/29 R |
| 4,284,175 | 8/1981 | Ishii et al. | 187/29 R |
| 4,390,823 | 6/1983 | Brown et al. | 318/345 CA X |
| 4,399,892 | 8/1983 | Watanabe | 187/29 R |

FOREIGN PATENT DOCUMENTS

| 7049 | 1/1978 | Japan | 187/29 R |
|---|---|---|---|
| 98652 | 8/1978 | Japan | 187/29 R |
| 140749 | 12/1978 | Japan | 187/29 R |
| 56-132275 | 10/1981 | Japan . | |
| 2111251 | 6/1983 | United Kingdom | 187/29 D |

Primary Examiner—William M. Shoop
Assistant Examiner—Paul Shik Luen Ip
Attorney, Agent, or Firm—Leydig, Voit, Osann, Mayer and Holt, Ltd.

[57] ABSTRACT

A variable-voltage variable-frequency elevator control apparatus is disclosed in which a circuit for the consumption of regenerated power produced during regenerative braking is provided on the DC side of the apparatus rather than on the AC side. During regenerative braking with an emergency generating unit in operation, regenerated power is consumed by the consumption circuit on the DC side of the circuit and is prevented from being returned to the emergency generating unit. This prevents the production of voltage notches commonly produced during regenerative braking by thyristor commutation in conventional circuits. Because no voltage notches are produced, a reduction in the size of the emergency generating unit can be achieved. In addition, since it consumes DC power rather than 3-phase AC power, the consumption circuit requires fewer elements than in conventional control apparatuses.

10 Claims, 3 Drawing Figures

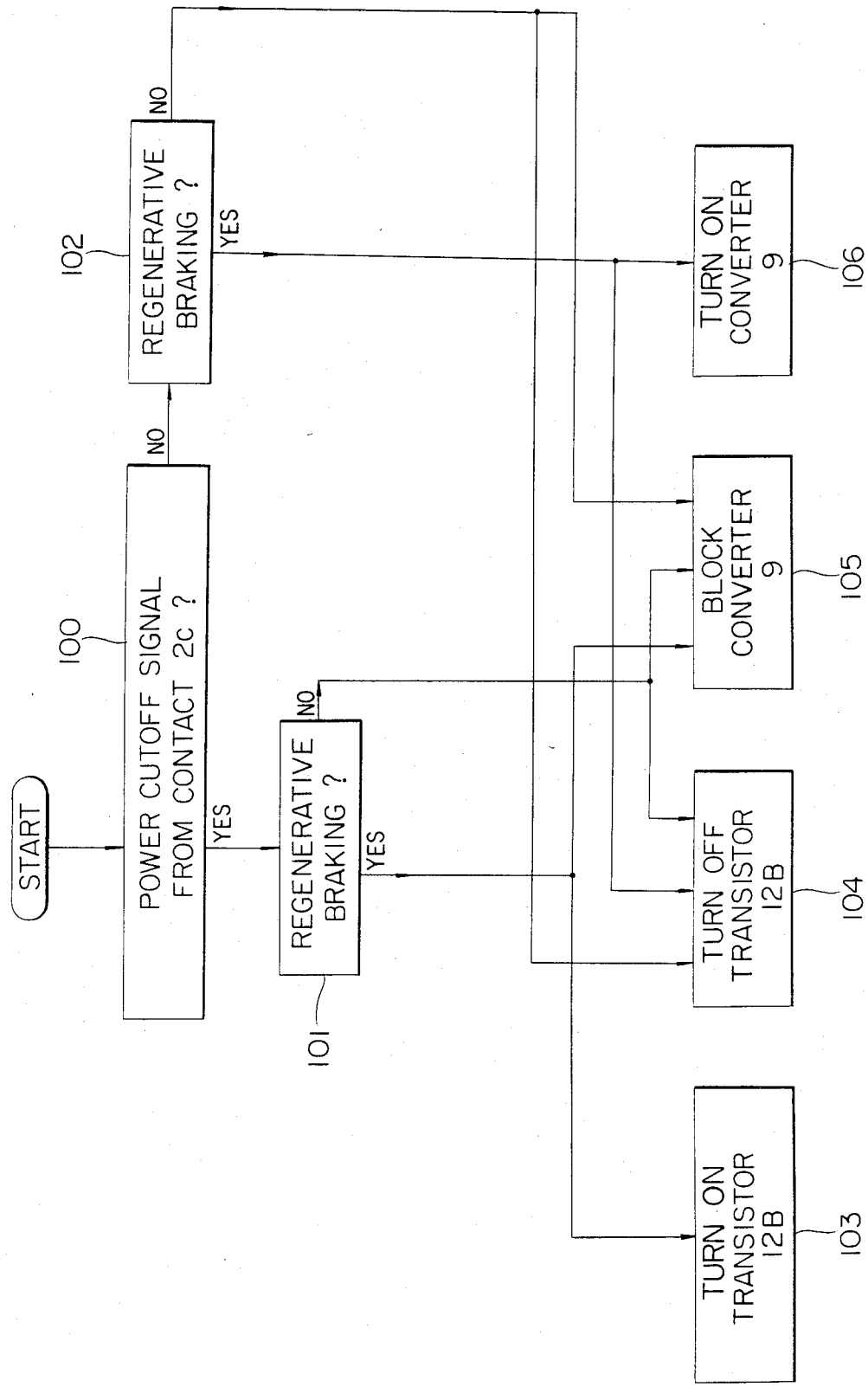

VARIABLE-VOLTAGE VARIABLE-FREQUENCY ELEVATOR CONTROL APPARATUS

BACKGROUND OF THE INVENTION

This invention relates to a variable-voltage variable-frequency (VVVF) elevator control apparatus, and in particular to a VVVF elevator control apparatus having improved ability to handle regenerated electric power produced during emergency operation of the elevator.

First, a conventional VVVF elevator control apparatus will be described with reference to FIG. 1 of the attached drawings. In the figure, element number 1 is a 3-phase AC main power source, element number 2 is a relay energized by the main power source 1 for detecting any cutoff of power from the main power source 1, element number 3 is a 3-phase AC emergency generating unit comprising a Diesel engine E.G. and an emergency generator G, element number 2A is a normally open contact (a contact which is open when the relay 2 is not energized and which is closed when it is) of the relay 2 connected in series in the load line of the main power source 1, and element number 2B is a normally closed contact (a contact which is closed when the relay 2 is not energized and which is open when it is) of the relay 2 which is connected in series in the load line of the emergency generating unit 3. FIG. 1 represents the state when the main power source 1 is off and accordingly the relay 2 is not energized. Thus, the figure shows contact 2A in its open state and contact 2B in its closed state. Element number 4 is a power running converter, i.e. a 3-phase full-wave rectifier comprising a 3-phase diode bridge. The AC input side of the power running converter 3 is connected to the main power source 1 via the normally open contact 2A and to the emergency generating unit 3 via the normally closed contact 2B. Element number 5 and element number 6 are a reactor and a smoothing capacitor, respectively, connected on the DC output side of the power running converter 4. Element number 7 is an inverter of the pulse width modulation (PWM) type comprising a transistor bridge. Element number 8 is a 3-phase induction motor connected to the AC output side of the inverter 7 which is used to power the elevator. Element number 9 is a regenerated power AC-DC converter comprising a thyristor bridge. The regenerated power converter 9 has its DC input side connected to the DC side of the power running converter 4 and has its AC output side connected to the AC load line via a boosting transformer 10. Element number 11 is a regenerated power consumption circuit connected to the AC load line, the consumption circuit 11 comprising thyristors 11A, resistors 11B, and diodes 11C. Element number 13 is a tachometer generator for measuring the speed of the induction motor 8, element number 14 is a voltage detector for detecting DC voltage, and element number 20 is a speed command generator which outputs a speed command to a controller 21 which outputs control signals to the inverter 7, regenerated power converter 9, and thyristor 11A. The controller 21 is connected to a normally closed contact 2C (one which is closed when the relay is not energized and which is open when it is) of the relay 2 for detecting power cutoffs.

During normal power running of the induction electric motor 8 in an elevator controlled by this conventional control apparatus, the relay 2 is energized by the main power source 1, and the normally open contact 2A is held closed while the normally closed contact 2B is held open. (In the description below, "normal" will be used to refer to the state when the main power source 1 is in operation, and "emergency" will be used to refer to the state when the main power source 1 is disconnected and the emergency generating unit 3 is in operation.) AC power from the main power source 1 is full-wave rectified by the power running converter 4. The DC output from the power running converter 4 is smoothed by the smoothing capacitor 6 and then converted to 3-phase AC power by the inverter 7 which produces a variable voltage and variable frequency by pulse width modulation, and this AC power is then applied to the induction motor 8 to drive it.

During normal regenerative running of the elevator, the thyristors in the regenerated power converter 9 are turned on by a signal from the controller 21, and the regenerated power converter receives regenerated power from the induction motor 8 which it returns to the main power source 1 via the boosting transformer 10. At this time, if the reactance of the reactor 5 is sufficiently large, the power returned to the main power source 1 is a square wave with a 120° conduction period. Since the thyristors 11A are not turned on at this time, the consumption circuit 11 does not absorb any of the regenerated power.

Next, the operation of this conventional control apparatus will be explained for the case when power is provided by the emergency generating unit 3. If for some reason the main power source 1 should fail to function, the relay 2 for detecting power cutoffs will drop out, causing the normally open contact 2A to open and the normally closed contact 2B to close. This will allow the emergency generating unit 3 to supply power to the induction motor 8. The power produced by the emergency generating unit 3 is full-wave rectified by the power running converter 4, smoothed by the smoothing capacitor 6, converted to pulse width modulated 3-phase AC power by the inverter 7, and applied to the induction motor 8 to drive it.

In general, the capacity of the emergency generating unit 3 is quite small, making it impossible for it to absorb the power produced by the induction motor 8 during regenerative braking. Accordingly, the regenerated power consumption circuit 11 is provided in the conventional control apparatus to absorb this power. The thyristors 11A in the consumption circuit 11 may be used merely as a switch or may be linked with the gating of the thyristors of the regenerated power converter 9 and be phase controlled. The signal for gating the thyristors 11A is issued by the controller 21. The internal logic of the controller 21 is switched when the normally closed contact 2C closes upon the occurrence of a power cutoff.

Because the thyristors comprising the regenerated power converter 9 are phase controlled, an overlapping angle is produced during thyristor commutation and a sharp voltage notch appears. This voltage notch may cause the exciting gating circuit (not shown) for the emergency generating unit 3 to misfire which results in the unstable operation of the emergency generating unit 3. This conventional control circuit thus has the disadvantage that it is necessary to increase the capacity of the emergency generating unit 3 in order to reduce the effect exerted upon it by voltage notches.

Another disadvantage of this conventional control apparatus is that the regenerated power consumption circuit 11 is on the AC side of the converter 4 and must absorb 3-phase AC power. Accordingly, the circuit 11 requires a large number of elements: at least three thyristors, where diodes, and three transistors.

SUMMARY OF THE INVENTION

It is the object of the present invention to provide a VVVF elevator control apparatus which does away with the above-described drawbacks of the prior art and does not produce a voltage notch during emergency regenerative braking, thus allowing a reduction in the capacity of the emergency generating unit.

It is a further object of the present invention to provide a VVVF elevator control apparatus whose regenerated power consumption circuit uses fewer components than used in a conventional VVVF elevator control apparatus.

In an elevator control apparatus according to the present invention, a regenerated power consumption circuit is provided on the DC side of the power running converter rather than the AC side. A control means is also provided for turning on the regenerated power consumption circuit and for turning off the regenerated power converter during emergency regenerative braking. With this construction, the regenerated power converter is blocked during emergency regenerative braking and therefore produces no voltage notches which could adversely affect the emergency generating unit. This permits a reduction in the size of the emergency generating unit. Furthermore, location of the regenerated power consumption circuit on the DC side of the power running converter permits a simplification of the structure of the consumption circuit.

BRIEF DESCRIPTION OF THE DRAWINGS

FIG. 3 is a flowchart illustrating the operation of the controller in the embodiment of FIG. 2.

DESCRIPTION OF THE PREFERRED EMBODIMENT

Figure 1:
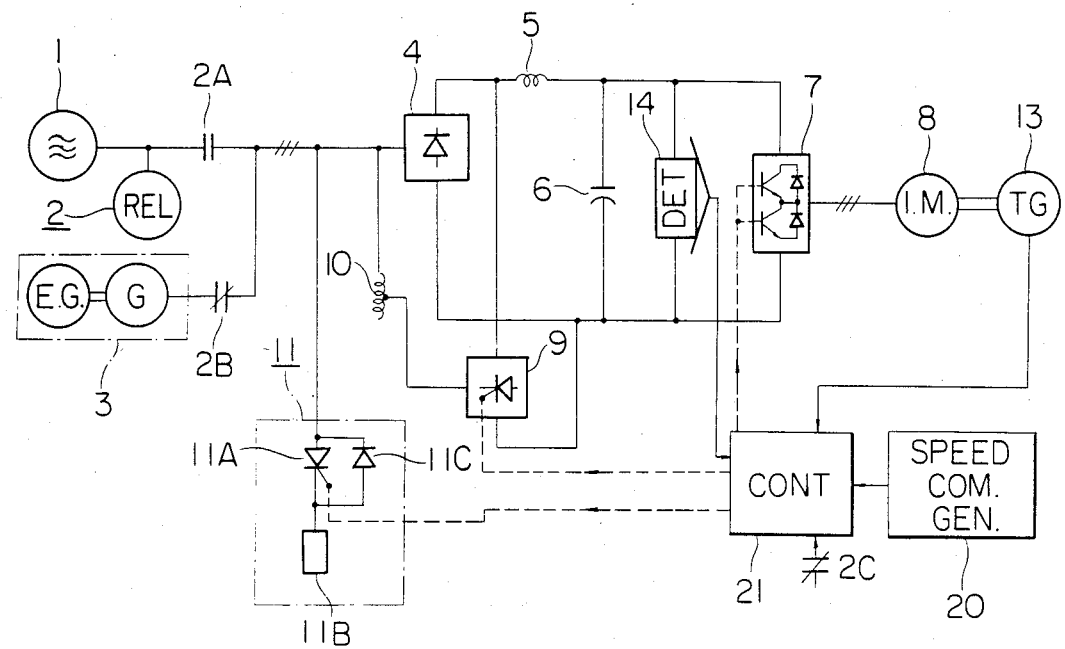
FIG. 1 is a schematic diagram of a conventional VVVF elevator control apparatus.
Figure 2:
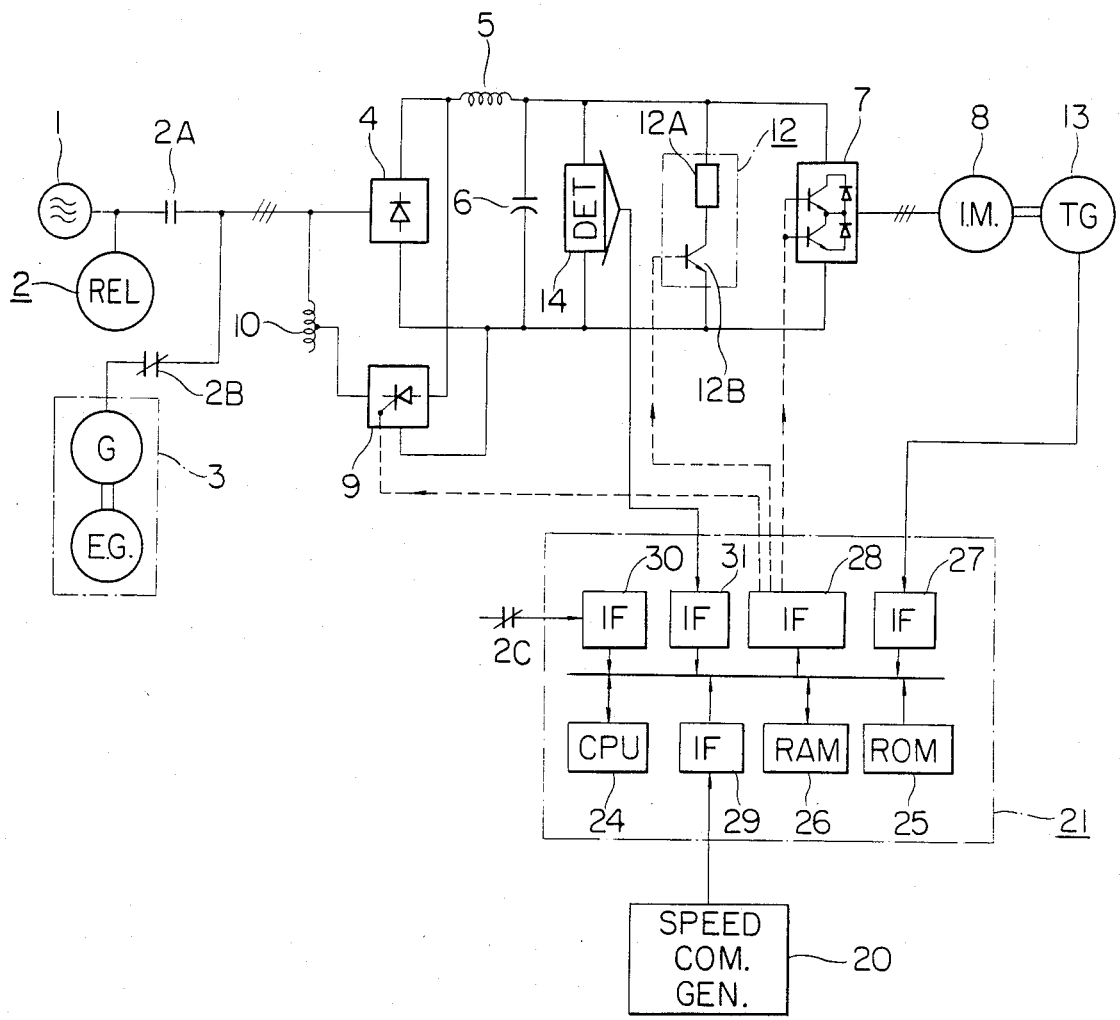
FIG. 2 is a schematic diagram of a VVVF elevator control apparatus according to the present invention.

One embodiment of a VVVF elevator control apparatus according to the present invention will now be described while making reference to FIG. 2 of the attached drawings in which reference numerals identical to those used in FIG. 1 represent identical or corresponding parts.

In the figure, element number 12 is a regenerated power consumption circuit connected in parallel with the inverter 7 on the DC output side of the power running converter 4 comprising a resistance 12A and a transistor 12B connected in series. The transistor 12B is controlled by the controller 21, which turns on the transistor 12B and at the same time blocks the regenerative converter 9 during emergency regenerative braking.

Element number 24 is the central processing unit of the controller 21, element number 25 is a read only memory, element number 26 is a random access memory for temporary storage of data and results of calculation, element number 27 is an interface for receiving the output signal from the tachometer generator 13, element number 28 is an interface for sending control signals to the inverter 7, the regenerated power converter 9, and the transistor 12B, element number 29 is an interface for receiving signals from the speed command generator 20, element number 30 is an interface for receiving a signal from the normally closed contact 2C, and element number 31 is an interface for receiving signals from the voltage detector 14.

The operation of this embodiment is as follows. During normal power running, the power produced by the main power source 1 is full-wave rectified by the power running converter 4, smoothed by the smoothing capacitor 6, converted to VVVF 3-phase AC power by the inverter 7, and applied to the induction motor 8 to drive it.

During normal regenerative braking, the regenerated power converter 9 is turned on, and the regenerated power from the induction motor 8 is returned to the main power source 1 via the boosting transformer 10.

During emergency power running, the power produced by the emergency generating unit 3 is full-wave rectified by the power running converter 4, smoothed by the smoothing capacitor 6, converted to VVVF 3-phase AC power by the inverter 7, and applied to the induction motor 8 to drive it.

Now, during emergency regenerative braking, the controller 21 blocks the regenerated power converter 9 and turns on the transistor 12B of the regenerated power consumption circuit 12 so that the regenerated power can be consumed by the resistance 12A. The regenerated power from the induction motor 8 is thus prevented from being returned to the emergency generating unit 3 and is consumed by the resistance 12A in the consumption circuit 12. Thus, in contrast to the conventional apparatus described earlier, the emergency generating unit 3 in the present embodiment is uninfluenced by regenerated power.

FIG. 3 is a flowchart of the operation of the controller 21. In Step 100, the controller 21 determines whether there is a power cutoff by ascertaining whether there is a signal from the normally closed contact 2C, which closes and provides an output signal upon occurrence an abnormality such as of a power cutoff. If there is no signal from the contact 2C, the controller 21 carries out Step 101 and determines whether regenerative braking or power running is taking place. If there is a signal from the contact 2C in Step 100, indicating a power abnormality such as cutoff, the controller 21 instead proceeds to Step 102 and makes the same determination as in Step 101.

Based on the results of Step 101 and 102, the controller 21 carries out the appropriate ones of Steps 103 through 106. Step 103 is the turning on of the transistor 12B which enables the absorption of regenerated power by the consumption circuit 12, Step 104 is the turning off of the same transistor 12B to prevent power from being consumed by the consumption circuit 12, Step 105 is the blocking of converter 9 to prevent regenerated power from being returned to the emergency generating unit 3, and Step 106 is the turning on of the converter 9 to enable regenerated power to be returned to the main power source 1.

The determination in Steps 101 and 102 of whether or not regenerative braking is taking place is based on a signal from the voltage detector 14 which measures the DC voltage across the terminals of the smoothing capacitor 6. During regenerative braking, this DC voltage is greater than during power running. Regenerative braking is determined by detecting when the DC voltage measured by the detector 14 rises above a predetermined value.

In the present invention, since the regenerated power converter 9 is blocked whenever the emergency generating unit 3 is in operation, there are no instances in which commutation of its thyristors can have harmful effects on the emergency generating unit 3. Therefore, the capacity of the emergency generating unit 3 can be reduced compared with that used in the conventional control apparatus pictured in FIG. 1, where excess capacity is required to reduce the susceptibility of the emergency generating unit 3 to the effects of thrysitor commutation.

Another advantage of the present invention is that the regenerated power consumption circuit 12 consumes DC power rather than 3-phase AC power. It can therefore be of simpler and less expensive construction than the consumption circuit 11 in the conventional control apparatus, which consumes 3-phase AC power.

Although the power running converter 9 was described as comprising diodes, thyristors may be used instead. If thyristors are used, pulse amplitude modulation (PAM) may be used to control the converter 4. If PAM is used, voltage notches are produced during power running which is undesirable from the standpoint of the emergency generating unit 3. However, if PAM is employed, the noise produced by the induction motor 8 at low speeds can be reduced. If only PWM is used, control using only the inverter 7 is possible.

Since a larger amount of noise than usual is acceptable during emergency operation, it may be desirable for the converter 4 to be run without PAM control during emergency power running and with the full voltage applied to the converter 4, in which case no undesirable voltage notches will be produced.

What is claimed is:

1. An improved variable-voltage variable-frequency elevator control apparatus of the type having a 3-phase AC main power source, a power running converter with its AC input side connected to said main power source, an inverter of the pulse width modulation type with its DC input side connected to the DC output side of said power running converter, an induction motor connected to the AC output side of said inverter, an emergency generating unit connected to the AC input side of said power running converter, a regenerated power DC to AC converter with its input side connected to the DC input side of said inverter and with its output side connected to the AC input side power running converter, wherein the improvement comprises:
   means for consuming regenerated power connected across the DC input side of said inverter; and
   control means for turning said means for consuming regenerated power on during emergency regenerative braking and off at other times and for turning said regenerated power converter on during normal regenerative braking and off and blocking the transmission of DC power from the DC input side of the regenerated power converter to its AC output side at other times, said control means turning said means for consuming regenerated power on and turning said regenerated power converter off instantaneously at the same time responsive to detecting abnormalities in the power from said power source and shifting to the emergency generating unit, and a regenerative braking condition.

2. An improved variable-voltage variable-frequency elevator control apparatus as claimed in claim 1, wherein said means for consuming regenerated power comprises a resistance and a switching element connected in series.

3. An improved variable-voltage variable-frequency elevator control apparatus as claimed in claim 1, further comprising a smoothing capacitor connected across the DC output side of said power running converter, a voltage detector connected to measure the smoothed DC output voltage and to supply a control signal representing emergency regenerative braking, and said control means including a CPU which operates in a programmed sequence upon receiving said control signal and upon detecting power cutoff, to turn on and off said means for consuming regenerated power and said regenerated power converter.

4. An improved variable-voltage variable-frequency elevator control apparatus as claimed in claim 1, further comprising means for detecting abnormalities in said main power source, said means for detecting abnormalities including means for connecting said main power source to said power running converter when no abnormality is detected and for disconnecting it when an abnormality is detected and for connecting said emergency generating unit to said power running converter when an abnormality is detected and for disconnecting it when no abnormality is detected.

5. An improved variable-voltage variable-frequency elevator control apparatus as claimed in claim 4, further comprising detecting means for detecting when regenerative braking is taking place.

6. An improved variable-voltage variable-frequency elevator control apparatus as claimed in claim 5, wherein said detecting means comprises a voltage detector connected so as to measure the DC voltage across said smoothing capacitor.

7. An improved variable-voltage variable-frequency elevator control apparatus as claimed in claim 1, wherein said control means comprises a CPU which operates in a programmed sequence upon detecting power cutoff and emergency regenerative braking, to turn on and off said means for consuming regenerated power and said regenerated power converter.

8. An improved variable-voltage variable-frequency elevator control apparatus as claimed in claim 7, including a smoothing circuit connected to the DC output side of the power running converter and a voltage detector connected to measure the smoothed DC output voltage from said smoothing circuit and to supply a control signal to the CPU representing emergency regenerative braking.

9. An improved variable-voltage variable-frequency elevator control apparatus as claimed in claim 5, wherein said means for consuming regenerated power is arranged in parallel with said capacitor.

10. An improved variable-voltage variable-frequency elevator control apparatus as claimed in claim 5, further comprising a switching element provided in said means for consuming regenerated power, and wherein said motor is determined to be in regenerative operation when the terminal voltage of said smoothing capacitor is higher than a predetermined value, and when said means for detecting abnormalities detects abnormalities of the power source during regenerative operation of said motor, said regenerated power converter is stopped in operation and said switching element is actuated to connect said means for consuming regenerated power.

* * * * *